(12) United States Patent
Kairali et al.

(10) Patent No.: US 12,409,549 B2
(45) Date of Patent: Sep. 9, 2025

(54) INCREASING STRENGTH OF A ROBOTIC STRUCTURE USING SWARM ROBOT(S)

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 720 days.

(21) Appl. No.: 17/581,574

(22) Filed: Jan. 21, 2022

(65) Prior Publication Data

US 2023/0234224 A1    Jul. 27, 2023

(51) Int. Cl.
*B25J 9/16* (2006.01)
*B25J 9/00* (2006.01)

(52) U.S. Cl.
CPC ........... *B25J 9/1633* (2013.01); *B25J 9/0084* (2013.01); *G05B 2219/39146* (2013.01); *G05B 2219/40434* (2013.01)

(58) Field of Classification Search
CPC ...... B25J 9/1633; B25J 9/0084; B25J 9/1617; B25J 9/026; B25J 18/002; G05B 2219/39146; G05B 2219/39153; G05B 2219/40434
See application file for complete search history.

(56) References Cited

U.S. PATENT DOCUMENTS

| | | | | |
|---|---|---|---|---|
| 6,725,128 B2 * | 4/2004 | Hogg | ..................... | G06N 3/008 702/182 |
| 9,446,775 B2 * | 9/2016 | Yoshizu | ..................... | B61F 5/52 |
| 2020/0189712 A1 * | 6/2020 | Briod | ..................... | B64U 10/13 |

FOREIGN PATENT DOCUMENTS

| | | | | |
|---|---|---|---|---|
| CN | 104495622 A | * | 4/2015 | ............. B66C 13/16 |
| CN | 111655433 A | * | 9/2020 | ............ B25J 9/1638 |
| CN | 111843996 A | | 10/2020 | |

(Continued)

OTHER PUBLICATIONS

Dai et al., "Robot operation strengthened with second arm," IP.com Prior Art Database, Technical Disclosure No. IPCOM000256860D, Jan. 4, 2019, 4 pages.

(Continued)

*Primary Examiner* — Truc M Do
*Assistant Examiner* — Noah W Stiebritz
(74) *Attorney, Agent, or Firm* — Zilka-Kotab, P.C.

(57) ABSTRACT

A computer-implemented method according to one embodiment includes identifying a load that will be applied to a robotic structure, and determining whether the load, when applied to the robotic structure, would exceed a structural threshold of the robotic structure. In response to determining that the load, when applied to the robotic structure, would exceed the structural threshold, a position of one or more swarm robots with respect to the robotic structure is determined that would increase a structural strength of the robotic structure, and the one or more swarm robots are caused to assume the determined position. A computer program product according to another embodiment includes a computer readable storage medium having program instructions embodied therewith. The program instructions are readable and/or executable by a computer to cause the computer to perform the foregoing method.

20 Claims, 10 Drawing Sheets

(56) References Cited

FOREIGN PATENT DOCUMENTS

| | | | |
|---|---|---|---|
| CN | 111496781 B | 8/2021 | |
| TW | 201637798 A | 11/2016 | |
| WO | WO-2019109384 A1 * | 6/2019 | ........... A01C 21/007 |

OTHER PUBLICATIONS

The Engineering Toolbox, "Area Moment of Inertia," The Engineering Toolbox, 2022, 16 pages, retrieved from https://www.engineeringtoolbox.com/area-moment-inertia-d_1328.html on Jan. 19, 2022.

ECUSW, "Moment of Inertia Examples," YouTube video, May 16, 2013, 2 pages, retrieved from https://www.youtube.com/watch?v=WDdkdC1sFQQ.

Baldwin, S., "Steel Trusses," Pinterest, 2022, 1 pages, retrieved from https://in.pinterest.com/pin/225743000045503744/ on Jun. 19, 2022.

ECU, "Moment of Inertia," Google Search, ECU Department of Engineering, 2 pages, 2022, retrieved from https://www.google.com/search?q=east+carolina+department+of+engineering,+moment+of +inertia&rlz=1C1GCEU_enUS835US835&source=lnms&tbm=isch&sa=X&ved=2ahUKEwiajqb14qX1AhVOJTQIHUQxB2gQ_AUoAnoECAEQBA&biw=1920&bih=937&dpr=1#imgrc=V5Pa3gFVBLiJoM on Jan. 19, 2022.

* cited by examiner

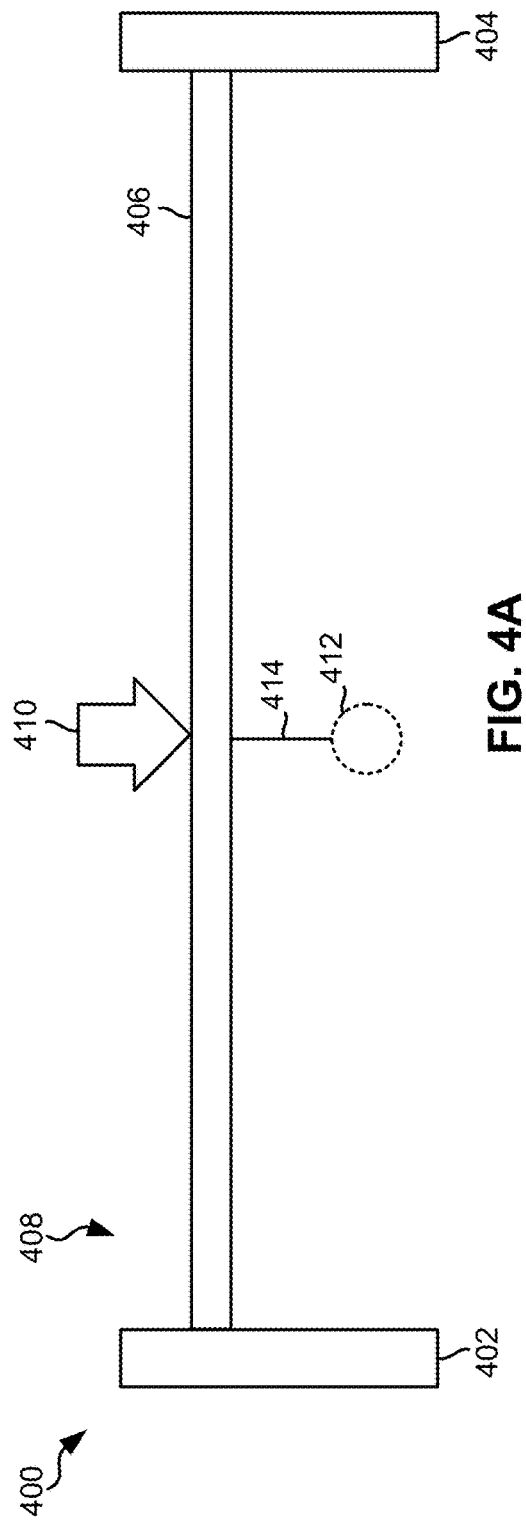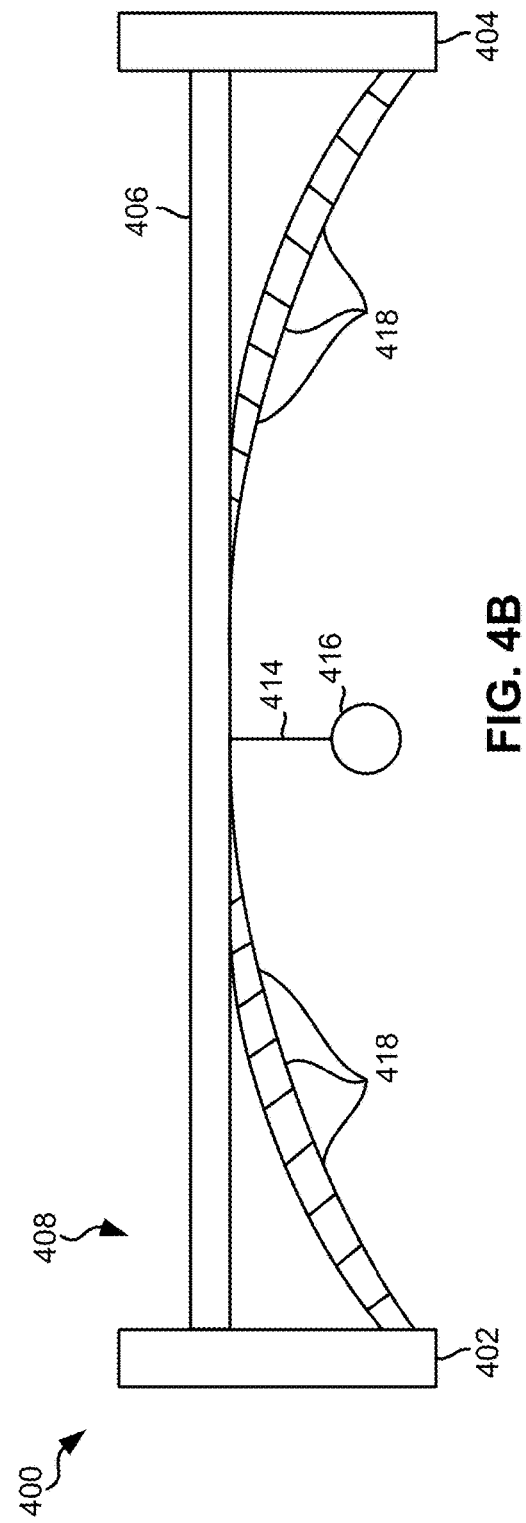

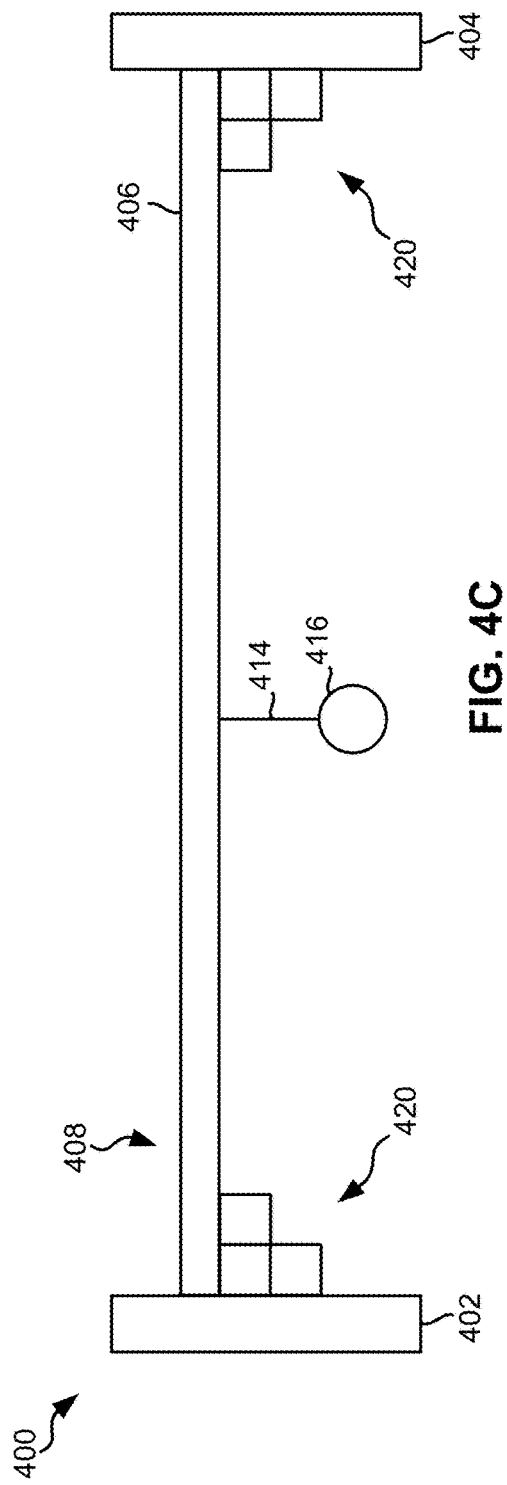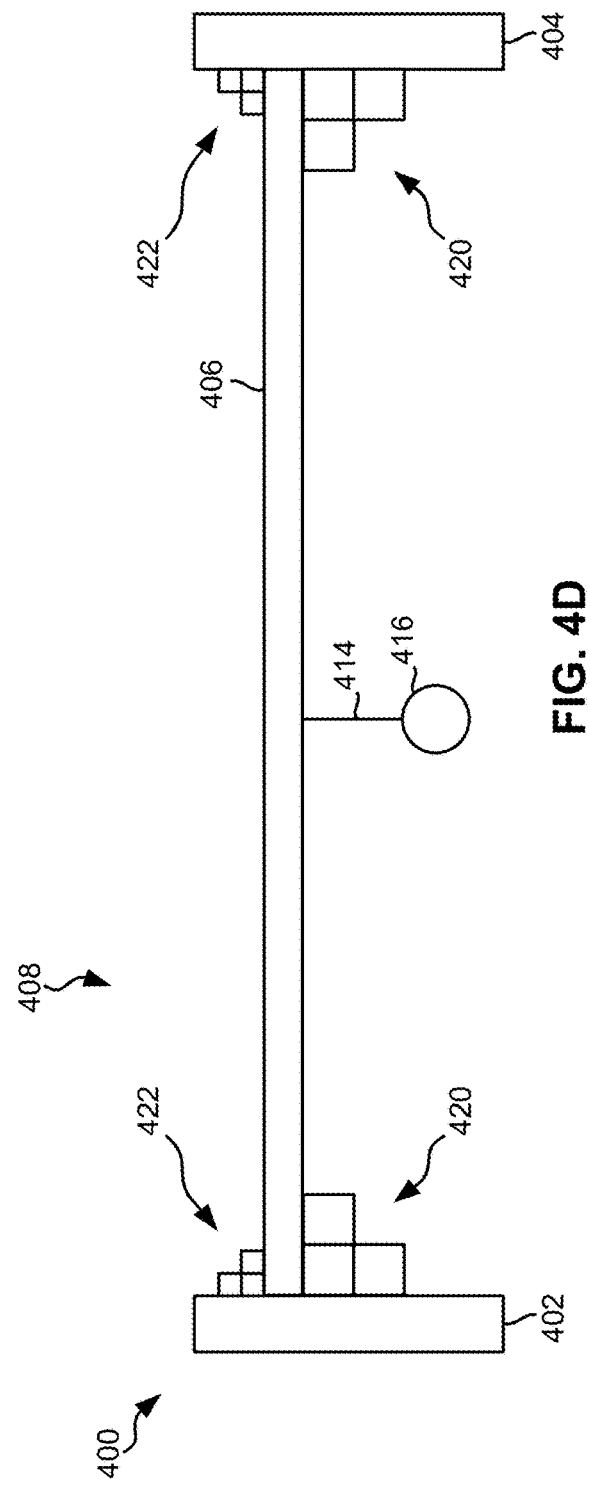

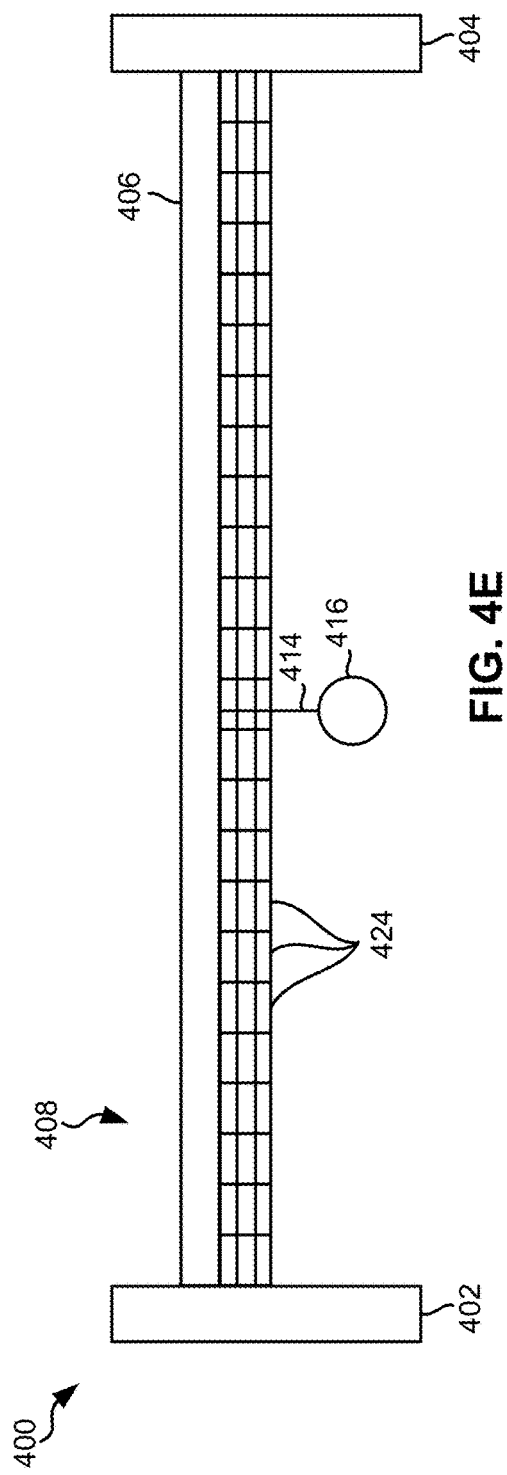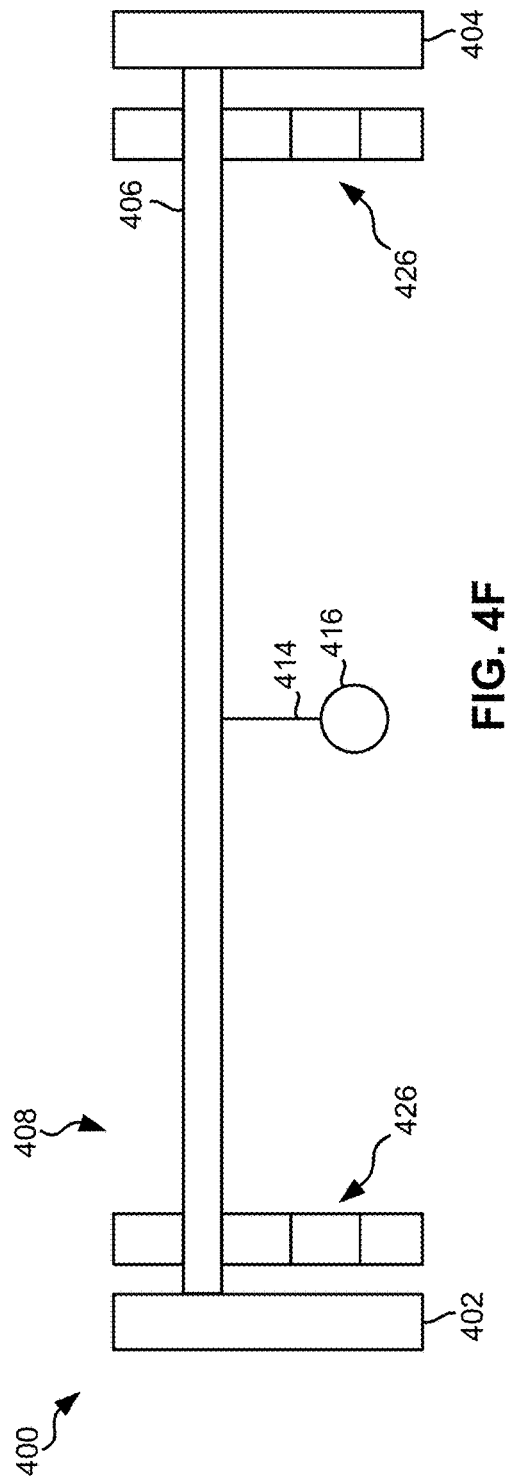

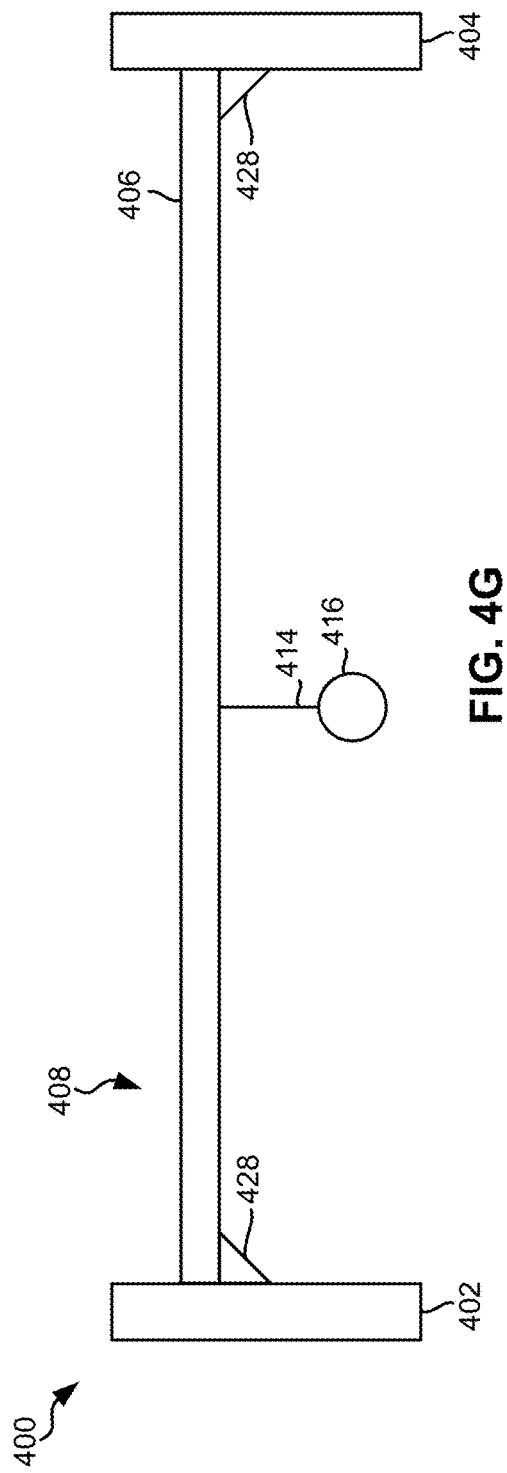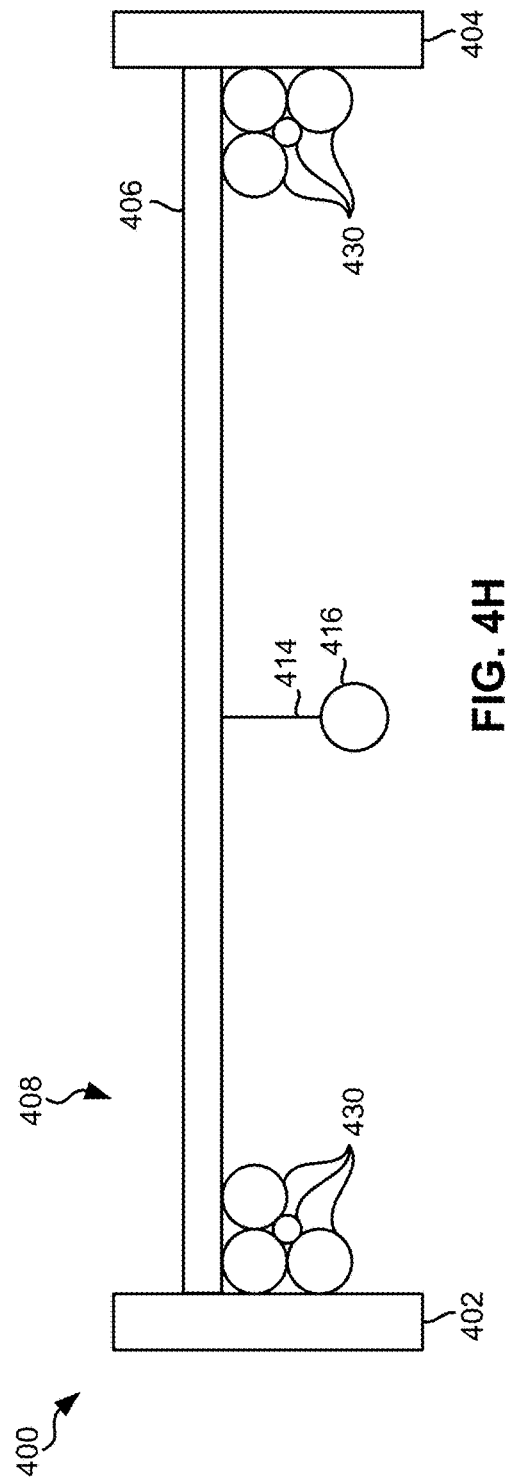

INCREASING STRENGTH OF A ROBOTIC STRUCTURE USING SWARM ROBOT(S)

BACKGROUND

The present invention relates to robotic structures, and more specifically, this invention relates to positioning one or more swarm robots with respect to a robotic structure to prevent a load that will be applied to the robotic structure from exceeding a structural threshold of the robotic structure.

Robotic structures of multi-robotic ecosystems are used for performing various activities such as material handling, removal of material, arranging material, etc. For example, robotic structures such as a crane, earth removal machine, robotic arms, etc., may be utilized for performing removal of debris from an area. More specifically, in some cases the activity area in which the robotic structures operate may include a warehouse, a machine shop floor, a disaster rescue area, etc. Various loads are applied to these robotic structures during such activities. For example, a load is applied to a robotic arm of a crane as the crane lifts a weighted object, a load is applied to an earth removal machine as a bucket of the earth removal machine scoops a load of dirt, a load is applied to a robotic arm as the robotic arm pulls a weighted object, etc.

SUMMARY

A computer-implemented method according to one embodiment includes identifying a load that will be applied to a robotic structure, and determining whether the load, when applied to the robotic structure, would exceed a structural threshold of the robotic structure. In response to determining that the load, when applied to the robotic structure, would exceed the structural threshold, a position of one or more swarm robots with respect to the robotic structure is determined that would increase a structural strength of the robotic structure, and the one or more swarm robots are caused to assume the determined position.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A is system that includes a robotic structure prior to a load being applied to the robotic structure, in accordance with one embodiment.

FIG. 4B is the system of FIG. 4A with a plurality of swarm robots positioned to increase a structural strength of the robotic structure, in accordance with one embodiment.

FIG. 4C is the system of FIG. 4A with a plurality of swarm robots positioned to increase the structural strength of the robotic structure, in accordance with one embodiment.

FIG. 4D is the system of FIG. 4A with a plurality of swarm robots positioned to increase the structural strength of the robotic structure, in accordance with one embodiment.

FIG. 4E is the system of FIG. 4A with a plurality of swarm robots positioned to increase the structural strength of the robotic structure, in accordance with one embodiment.

FIG. 4F is the system of FIG. 4A with a plurality of swarm robots positioned to increase the structural strength of the robotic structure, in accordance with one embodiment.

FIG. 4G is the system of FIG. 4A with a plurality of swarm robots positioned to increase the structural strength of the robotic structure, in accordance with one embodiment.

FIG. 4H is the system of FIG. 4A with a plurality of swarm robots positioned to increase the structural strength of the robotic structure, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for positioning one or more swarm robots with respect to a robotic structure to prevent a load that will be applied to the robotic structure from exceeding a structural threshold of the robotic structure.

In one general embodiment, a computer-implemented method includes identifying a load that will be applied to a robotic structure, and determining whether the load, when applied to the robotic structure, would exceed a structural threshold of the robotic structure. In response to determining that the load, when applied to the robotic structure, would exceed the structural threshold, a position of one or more swarm robots with respect to the robotic structure is determined that would increase a structural strength of the robotic structure, and the one or more swarm robots are caused to assume the determined position.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
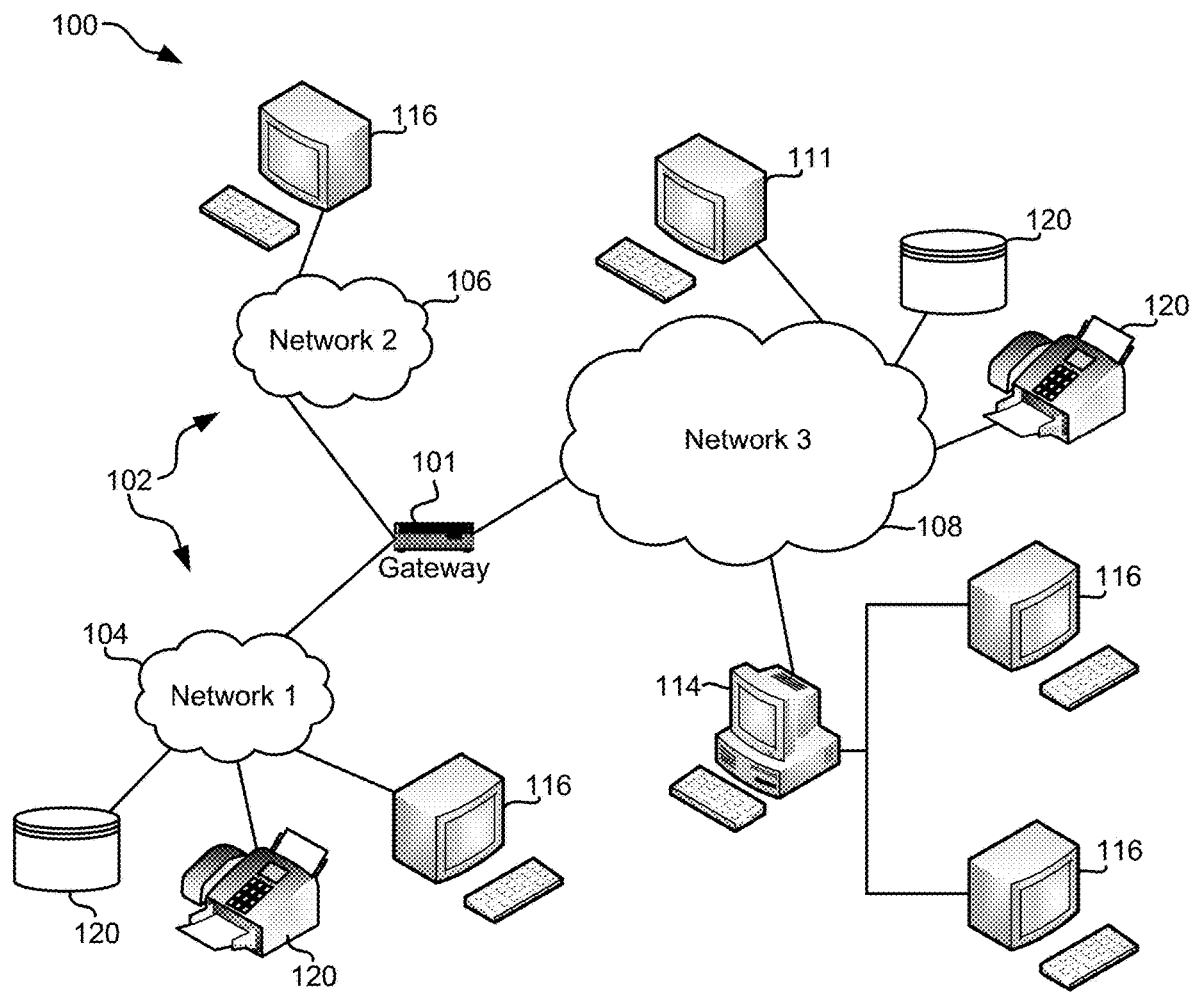
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
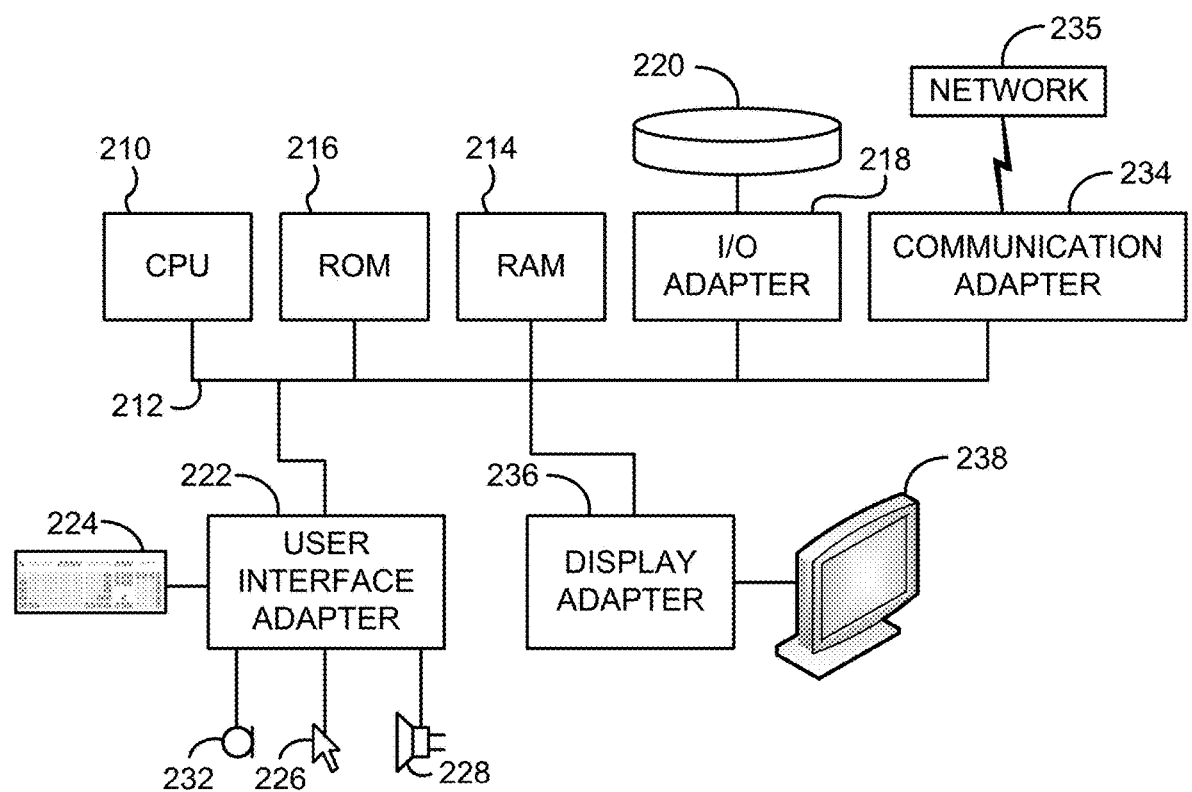
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere above, robotic structures of multi-robotic ecosystems are used for performing various activities such as material handling, removal of material, arranging material, etc. For example, robotic structures such as a crane, earth removal machine, robotic arms, etc., may be utilized for performing removal of debris from an area. More specifically, in some cases the activity area in which the robotic structures operate may include a warehouse, a machine shop floor, a disaster rescue area, etc. Various loads are applied to these robotic structures during such activities. For example, a load is applied to a robotic arm of a crane as the crane lifts a weighted object, a load is applied to an earth removal machine as a bucket of the earth removal machine scoops a load of dirt, a load is applied to a robotic arm as the robotic arm pulls a weighted object, etc.

As loads are applied to robotic structures during activities, such as those described above, there is a potential for one or more portions of the robotic structures to become damaged. For example, a load applied to a robotic structure may result in a robotic arm and/or sub-structure of the robotic structure being bent or broken. The strength of any arm or sub-structure of a robotic structure depends, at least in part, on an area moment of inertia. For different cross-sectional areas of a given robotic structure, there are different bending strengths and equivalently, many different breaking strengths. Many conventional robotic structures include a fixed structure in which components thereof are not adjusted based on a load that is applied to the fixed structure. More specifically, these fixed structures are not provided additional and/or less structural reinforcement during operation based on forces that are applied thereto. Accordingly, it is often the responsibility of an operator of the conventional robotic structure to ensure that the robotic structure does not experience a load that results in damage to the fixed structure. For example, although a point along an arm of a crane at which a load is hoisted from may be adjusted during use of the crane, the arm of the crane remains a fixed structure as different loads are applied to the arm of the crane. Unfortunately, operator errors occur based on incorrect calculations and/or misjudgments during use of robotic structures. These errors are sometimes catastrophically damaging to the robotic structure itself, the load, and/or structures around the robotic structure, and in some cases even deadly to humans nearby.

In sharp contrast to the deficiencies of the conventional techniques described above, various embodiments and approaches described herein include determining a positioning of one or more swarm robots with respect to a robotic structure to prevent a load that will be applied to the robotic structure from exceeding a structural threshold of the robotic structure. Various embodiments and approaches described herein furthermore include causing the one or more swarm robots to assume the determined position, which may thereafter be adjusted based on an activity that the robotic structure is scheduled to operate in and/or a load applied to the robotic structure changing.

Figure 3:
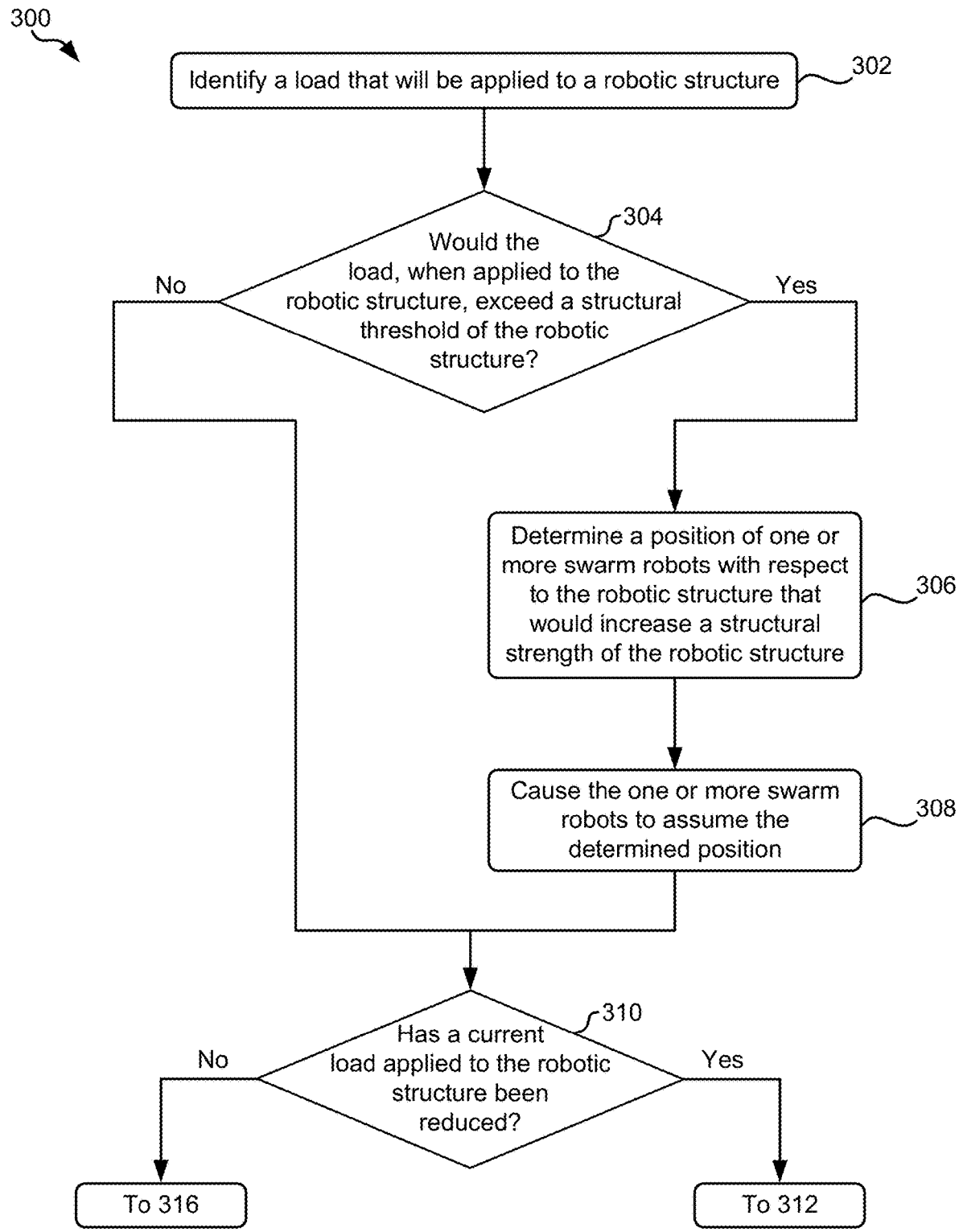
FIG. 3 is a flowchart of a method, in accordance with one embodiment.
Figure 3:
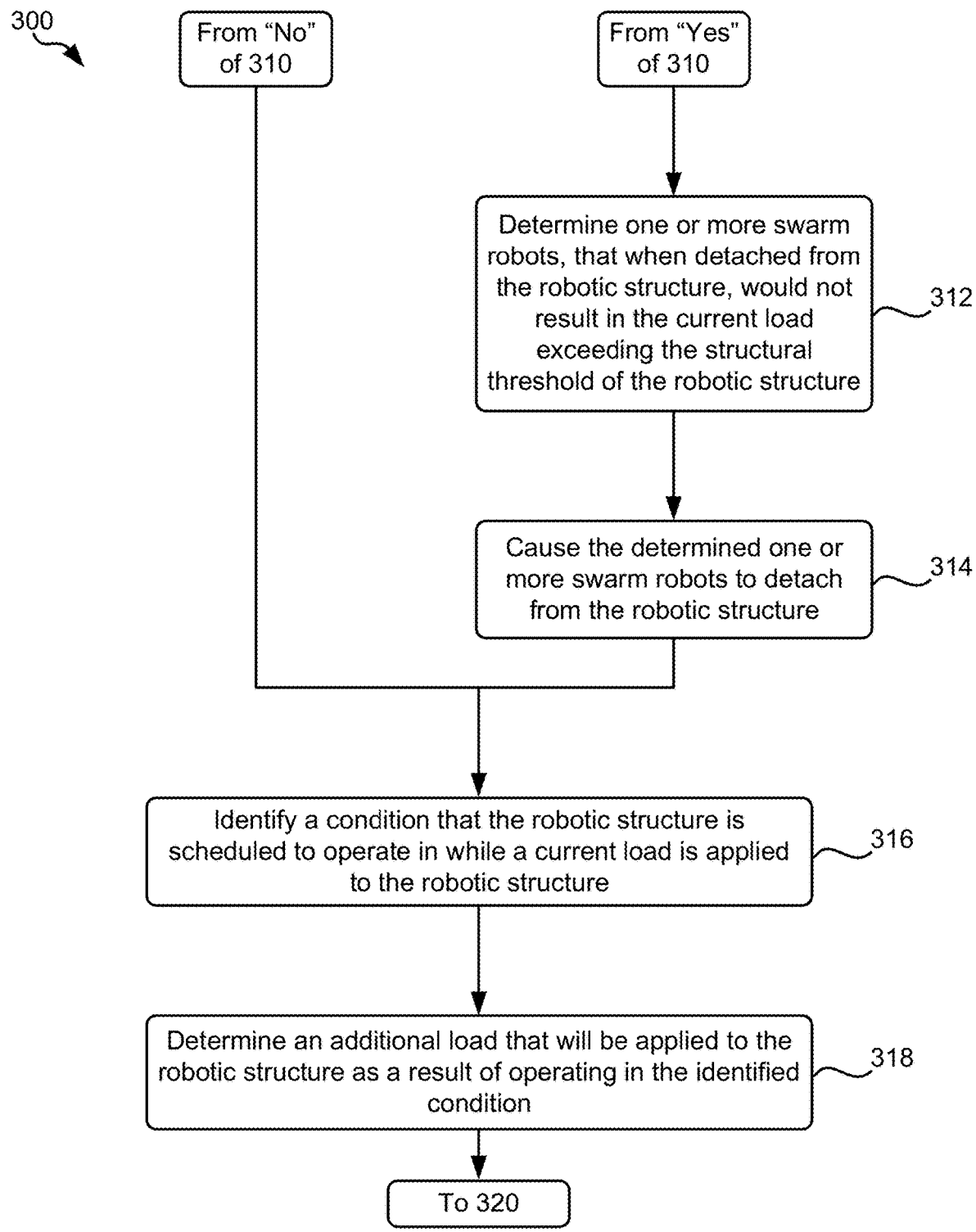
Figure 3:
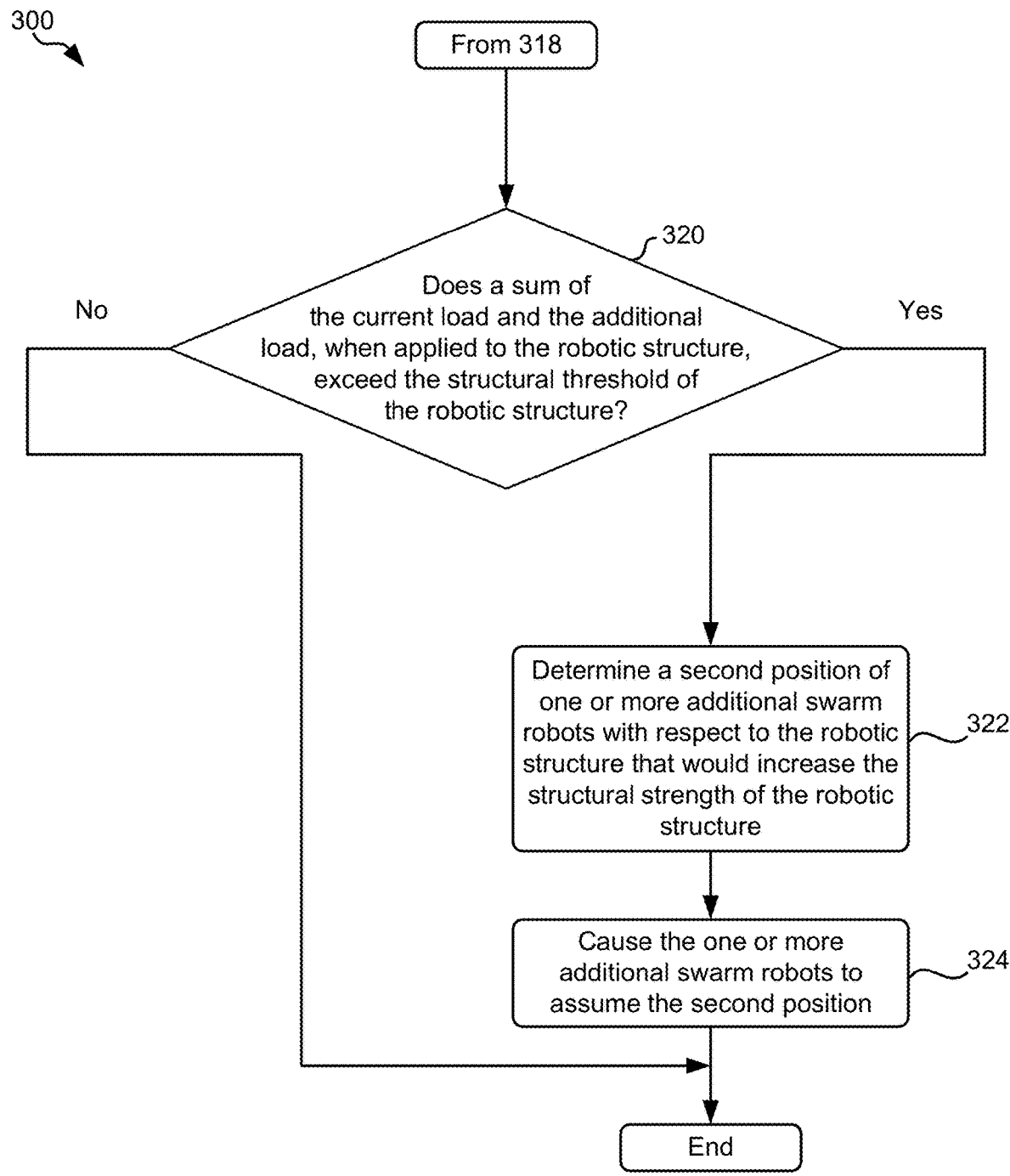

Now referring to FIG. 3, a flowchart of a method 300 is shown according to one embodiment. The method 300 may be performed in accordance with the present invention in any of the environments depicted in FIGS. 1-5B, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 of method 300 includes identifying a load that will be applied to a robotic structure. In some approaches, the robotic structure includes a multi-robotic ecosystem and/or a robotic system which may include a plurality of robotic components, e.g., a controllable crane assembly, a draw bridge, a ladder, an assembly line, etc. In some other approaches the robotic structure may include a single robotic component, e.g., a beam, an arm, a finger, etc., and/or portion thereof. The load is in some approaches any matter that includes at least some mass and/or is capable of applying a force on the robotic structure. Note that the load may additionally and/or alternatively include at least some material used to apply the load to the robotic structure, e.g., such as rope, cable, wire, a basket, netting, a hook, anchor bolts, adhesives, welding material, etc.

One basic technique for identifying a load that will be applied to the robotic structure includes receiving input that specifies the load, such as from a user, from another computer, from a scanner that scans a code on the load, etc. In other approaches, techniques for identifying a load that will be applied to the robotic structure may depend on the type of robotic structure and whether there is any scheduling that is generated in the process of the robotic structure being utilized. For example, assuming that the robotic structure is a crane assembly, e.g., a multi-pillar crane assembly, a cantilever crane assembly, a tripod crane assembly, etc., one technique for identifying a load that will be applied to the robotic structure includes referencing a schedule of shipping containers that are to be moved using the robotic structure. In another approach, a load that will be applied to the robotic structure may be identified as one or more loads that have been weighed, e.g., by a scale within a predetermined amount of time. In another approach, a load that will be applied to the robotic structure may be identified using known techniques, e.g., such as using known extrapolation techniques from a collection of information received from a scheduler.

A determination is made as to whether the load, when applied to the robotic structure, would exceed a structural threshold of the robotic structure, e.g., see decision 304. For context, such this determination may be made to ensure that the robotic structure has sufficient structural strength, e.g., with respect to a predetermined structural threshold, and that would allow the load to be applied to the robotic structure without the robotic structure being damaged as a result. The structural threshold of the robotic structure may include any known type of structural metric, e.g., a bending stress of at least a portion of the robotic structure; a breaking stress of at least a portion of the robotic structure; whether the load is a concentrated load with respect to the robotic structure, a uniformly distributed load, a uniformly varying load, a nonuniformly distributed load, etc. In one preferred approach, the structural threshold is a predetermined bending stress of the robotic structure, and/or equivalently a predetermined breaking stress of the robotic structure. Various techniques for determining whether the load, when applied to the robotic structure, would exceed the structural threshold of the robotic structure are described below.

A first technique for determining whether the load, when applied to the robotic structure, would exceed the structural threshold of the robotic structure may include identifying a specification of a component of the robotic structure, which may list a predetermined structural threshold of the robotic structure, e.g., such as the predetermined bending stress of the robotic structure. A moment of inertia of the robotic structure may additionally and/or alternatively be determined in order to determine whether the load, when applied to the robotic structure, would exceed the structural threshold of the robotic structure. In one approach, in order to determine the moment of inertia, a cross-sectional area of robotic arms of the robotic structure may be gathered, e.g., robotic arms of the robotic structure that the load will be applied to. In another approach, a knowledge corpus on structural strength and/or the area moment of inertia may be known and/or received. The structural shape, dimensions, etc., may be part of the knowledge corpus and may be used identify different structural shapes of the robotic structure in order to calculate an associated moment of inertia. Note that the moment of inertia may be determined with respect to any type of moment of inertia, e.g., a mass moment of inertia of the robotic structure, an area moment of inertia of the robotic structure, the polar moment of inertia. In one preferred approach, the moment of inertia of the robotic structure is determined using known techniques with respect to the polar moment of inertia, and more specifically at least a portion of the robotic structures resistance to being distorted by torsion. With the moment of inertia of the robotic structure determined, it may be determined whether the bending stress of the robotic structure, when the load is applied about the moment of inertia of the robotic structure, would be exceeded. Note that known techniques and/or techniques that would be appreciated by one of ordinary skill in the art upon reading the descriptions herein may additionally and/or alternatively be utilized to determine whether the bending stress of the robotic structure, when the load is applied about the moment of inertia of the robotic structure, would be exceeded. In response to a determination that the bending stress of the robotic structure, when the load is applied about the moment of inertia of the robotic structure, would be exceeded, in some approaches it may be determined that applying the load to the robotic structure would exceed the structural threshold of the of the robotic structure. In contrast, in response to a determination that the bending stress of the robotic structure, when the load is applied about the moment of inertia of the robotic structure, would not be exceeded, in some approaches it may be determined that applying the load to the robotic structure would not exceed the structural threshold of the of the robotic structure.

In some approaches, a digital twin simulation may be applied as a technique for determining whether the load, when applied to the robotic structure, would exceed the structural threshold of the robotic structure. For example, in one or more of such approaches, method 300 may include performing a simulation of applying the load to the robotic structure using a digital twin of the robotic structure and load. One or more known techniques for performing digital twin simulation for a known load and a robotic structure may be utilized in some approaches. The determination of whether the load, when applied to the robotic structure would exceed the structural threshold of the robotic structure, may be based on results of the performed digital twin simulation. For example, assuming that the results of the digital twin simulation indicate that the one or more portions of the robotic structure are permanently bent as a result of the load being applied to the robotic structure in the digital twin simulation, it may be determined that the load, when applied to the robotic structure, would exceed the structural threshold of the robotic structure. In contrast, assuming that the results of the digital twin simulation indicate that the one or more portions of the robotic structure are not permanently bent as a result of the load being applied to the robotic structure in the digital twin simulation, it may be determined that the load, when applied to the robotic structure, would not exceed the structural threshold of the robotic structure. Resilient deformation experienced by one or more portions of the robotic structure while the load is applied to the robotic structure may additionally and/or alternatively be considered in order to determine whether the load, when applied to the robotic structure, would exceed a structural threshold of the robotic structure. For example, in one approach, assuming that the results of the digital twin simulation indicate that the one or more portions of the robotic structure are permanently deformed or broken while the load is applied to the robotic structure in the digital twin simulation, it may be determined that the load, when applied to the robotic structure, would exceed the structural threshold of the robotic structure. In such an approach, assuming that the results of the digital twin simulation indicate that the one or more portions of the robotic structure are not deformed while the load is applied to the robotic structure in the digital twin simulation, it may be determined that the load, when applied to the robotic structure, would not exceed the structural threshold of the robotic structure. In another approach, where the robotic structure is resiliently deformable, if the results of the digital twin simulation indicate that the one or more portions of the robotic structure are deformed while the load is applied to the robotic structure but then return to their previous state when the load is removed in the digital twin simulation, e.g., deformation of the robotic structure is not permanent, it may be determined that the load, when applied to the robotic structure, would not exceed the structural threshold of the robotic structure.

In some approaches, one or more portions of the robotic structure may be specifically considered in order to determine whether the load, when applied to the robotic structure, would exceed the structural threshold of the robotic structure. For example, these portions of the robotic structure may be identified as portions that would experience a bending stress as a result of the load being applied to the robotic structure, e.g., a robotic arm, an I-beam, a crane boom, etc. In some approaches one or more of such portions may be identified by using known techniques to calculate the loads, e.g., bending stress(es), static loads, etc., that one or more predetermined portions of the robotic structure experience while the load is applied to the robotic structure. In one or more of such approaches, the structural threshold of the robotic structure may be one or more predetermined strength metrics of the portions. These one or more predetermined strength metrics of the portions may be compared with the calculated loads to determine whether the structural threshold of the robotic structure would be exceeded as a result of the load being applied to the robotic structure. For example, it may be determined that the load, when applied to the robotic structure, would exceed the structural threshold of the robotic structure in response to a determination that a calculated static load exceeds an associated predetermined strength metric of a portion of the robotic structure. In contrast, it may be determined that the load, when applied to the robotic structure, would not exceed the structural threshold of the robotic structure in response to a determination that the calculated static load does not exceed an associated predetermined strength metric of the portion of the robotic structure.

In response to determining that the load, when applied to the robotic structure, would exceed the structural threshold of the robotic structure, e.g., as illustrated by the "Yes" logical path of decision 304, a position of one or more swarm robots with respect to the robotic structure and/or a number of one or more swarm robots is determined that would increase a structural strength of the robotic structure, e.g., see operation 306. The swarm robots may be of a known type. In some approaches the position and/or the number of swarm robots is determined from a predefined table that lists different potential configurations of one or more swarm robots that are known to strengthen at least a portion of a robotic structure that a load may be applied to. In one preferred approach, the determined position is one that increases an area moment of inertia of the robotic structure, e.g., a cross-sectional area moment of inertia, as a result of the one or more swarm robots assuming the determined position. Because the swarm robots add mass to the robotic structure when in the determined position, the structural strength of the robotic structure may increase with the area moment of inertia of the robotic structure. According to various more specific approaches, the determined position may include one or more of, e.g., increasing a web height of at least a portion of the robotic structure, increasing a flange width of at least a portion of the robotic structure, increasing a flange thickness of at least a portion of the robotic structure, increasing a web thickness of at least a portion of the robotic structure, etc. The position of the one or more swarm robots is in some approaches determined based on an identified portion of the robotic structure that would be potentially damaged as a result of the load being applied to the robotic structure. For example, assuming that the robotic structure includes a crane, and the portion of the robotic structure that would be potentially damaged as a result of the load being applied to the robotic structure is determined to be a cantilevered crane boom, the position of one or more swarm robots preferably increases an area moment of inertia of the crane boom as a result of the one or more swarm robots assuming the determined position. In such an example, a cross-section area along an entirety or a majority of a longitudinal axis of the crane boom of the robotic structure may be increased as a result of the one or more swarm robots adding to the web thickness and/or flange thickness of the crane boom. In the determined position, the structural strength of the crane boom is increased by the swarm robots based on the crane boom's resistance to being distorted by torsion increasing.

In some approaches a direction that the load will be applied to the robotic structure is identified, e.g., downward bending stress, an angular bending stress, etc. In one or more of such approaches, the determined position for the one or more swarm robots may be configured to strengthen the robotic structure against the identified direction that the load will be applied, e.g., thereby creating more than an otherwise allowed bending strength for the robotic structure.

In one or more approaches in which a plurality of swarm robots are incorporated into the determined position, the plurality of the swarm robots are positioned in a cluster in which each of the swarm robots is attached to at least one other swarm robot in the cluster. In some approaches the swarm robots may include a known type of coupling mechanism by which one or more of the swarm robots are able to couple together to form a structure. In some other approaches, the swarm robots may be caused to carry and install coupling mechanisms to other swarm robot(s) and/or predetermined portions of the robotic structure. Furthermore, the swarm robots may additionally and/or alternatively be configured to couple with an existing robotic arm or sub-structure of the robotic structure and may change the cross-sectional area thereof. For example, two or more of a plurality of the swarm robots may be positioned in a linear cluster next to a web of a beam of the robotic structure and/or between flanges of a beam of the robotic structure. A plurality of other cluster shapes that a plurality of the swarm robots may be positioned in in the determined position include, e.g., a triangle, an oval, a rectangle, a square, filling a hollow portion of the robotic structure, filling portions of an I-beam to thereby establish a rectangular beam, etc.

Any known mechanism may be used to assist in coupling the swarm robots with each other and/or with the robotic structure. Examples include clamps, magnetic plates, tongue and groove type couplers, threaded couplers that mate with threaded holes, etc.

Operation 308 includes causing the one or more swarm robots to assume the determined position. As a result of the one or more swarm robots to assume the determined position, the robotic structure assumes an amount of structural strength that prevents the structural threshold from being exceeded when the load is applied.

In one approach, causing the one or more swarm robots to assume the determined position may include instructing a controller that is in communication with the one or more swarm robots. Causing the one or more swarm robots to assume the determined position may additionally and/or alternatively include independently instructing the one or more swarm robots to assume the determined position. In some approaches the one or more swarm robots may include components, e.g., wings, rotors, tracks, magnets, wheels, rollers, combustion powered engines, electricity powered engines, etc., that enable the one or more swarm robots to assume the determined position. Accordingly, causing the one or more swarm robots to assume the determined position may additionally and/or alternatively include instructing the one or more swarm robots to coordinates on the robotic structure that position the one or more swarm robots in the determined position. In some other approaches, causing the one or more swarm robots to assume the determined position may include instructing one or more other components, e.g., drones, controllable rollers, a delivery service, another robotic structure, etc., to deliver the one or more swarm robots to the determined position. In some approaches, known techniques may be utilized to perform the instructions described above.

In response to a determination that the load, when applied to the robotic structure, would not exceed the structural threshold of the robotic structure, e.g., as illustrated by the "No" logical path of decision 304, the method continues to decision 310.

One or more swarm robots may be detached from the robotic structure in response to a determination that a current load applied to the robotic structure has been reduced. For example, decision 310 of method 300 includes determining whether a current load applied to the robotic structure has been reduced, e.g., a load of a dynamic nature. In response to a determination that a current load applied to the robotic structure has been reduced, e.g., as illustrated by the "Yes" logical path of decision 310, one or more swarm robots, that when detached from the robotic structure, would not result in the current load, e.g., the load that is now reduced, exceeding the structural threshold of the robotic structure may be determined, e.g., see operation 312. Note that the optional detachment of one or more swarm robots that are currently positioned with respect to the robotic structure may be performed to allow the one or more detached swarm robots to be used elsewhere. In some other approaches, detached swarm robots may be replaced with swarm robots with a different structural strength. For example, one or more swarm robots may be replaced with one or more detached swarm robots with relatively less structural strength in response to a determination that a load applied to the robotic structure has been reduced. In contrast, one or more detached swarm robots may be replaced with one or more swarm robots with relatively more structural strength in response to a determination that a load applied to the robotic structure has been increased. However, the detachment of one or more swarm robots that are currently positioned with respect to the robotic structure preferably does not decrease a structural strength of the robotic structure to an extent that does not allow a load currently applied to the robotic structure and/or a load scheduled to be applied to the robotic structure to exceed the structural threshold of the robotic structure. Techniques described elsewhere above, e.g., such as performing digital twin simulation and/or comparing calculated loads, e.g., static inertia loads, dynamic inertia loads, etc., to one or more portions of the robotic structure may be utilized to ensure that the detachment of one or more swarm robots from the robotic structure does not allow a load currently applied to the robotic structure and/or a load scheduled to be applied to the robotic structure, to exceed the structural threshold of the robotic structure.

Operation 314 of method 300 includes causing the determined one or more swarm robots to detach from the robotic structure. In some approaches in which a plurality of swarm robot are determined for detaching from the robotic structure, the swarm robots of the plurality may be detached from the robotic structure in a predetermined series of detachment iterations, e.g., a maximum number of detachment iterations, at least two detachment iterations, etc. For example, assuming that it is determined that ten swarm robots may be detached from the robotic structure in response to a determination that a current load applied to the robotic structure has been reduced, the swarm robots may be detached from the robotic structure in pairs of two swarm robots over five different detachment iterations. Detachment of swarm robots from the robotic structure in a plurality of different detachment iterations may ensure that the robotic structure does not experience a sudden and relatively large increase in bending stress from a load that is currently applied to the robotic structure. Rather, the increase in bending stress that the robotic structure experiences as a result of a plurality of swarm robots detaching therefrom is gradually spaced over the plurality of detachment iterations. Of course, in some approaches, a similar consideration may be made with respect to whether a current load applied to the robotic structure has increased, and if such a determination is made, a position and/or number of additional swarm robots may be determined to increase the structural strength of the robotic structure to an extent that prevents the structural threshold from being exceeded.

Operating conditions experienced by the robotic structure and/or operating conditions that may be experienced by the robotic structure at a later time may additionally and/or alternatively be considered in order to prevent a load applied to the robotic structure and/or a load scheduled to be applied to the robotic structure from exceeding a structural threshold of the robotic structure. This is because operation of the robotic structure in some types of conditions may cause the robotic structure to experience forces, e.g., bending force, in addition to the force that is caused by a load being applied to the robotic structure. Various examples of types of conditions that the robotic structure may experience include expected environmental conditions, e.g., environmental temperature, wind speed, ambient light, moisture content, humidity, etc. These types of conditions may change a structural strength of the robotic structure, depending on the type of material that the robotic structure is constructed from. Accordingly, a type of condition that the robotic structure is scheduled to operate in while a current load is applied to the robotic structure may be identified, e.g., see operation 316. Known techniques may be used to identify such types of conditions. For example, a weather forecast for a location that the robotic structure is scheduled to operate at may be referenced to determine wind speeds, moisture contents, and humidity that the robotic structure may be subjected to.

The robotic structure may additionally and/or alternatively include one or more bending sensors and/or stress sensors, of known type, that are configured to gather data during operation and/or while a load is applied to the robotic structure. These sensors may be used to detect one or more conditions that are not scheduled, e.g., unanticipated changes such as wind speed that are experienced by the robotic structure and thereby impact the structural strength of the robotic structure. The sensors may detect the condition continuously, periodically, upon occurrence of an event (such as exceeding an extent of bending, exceeding a temperature change, etc.), etc.

An additional load that will be applied to the robotic structure as a result of operating in the identified condition may be determined in order to prevent the additional load, potentially in combination with the current load applied to the robotic structure, from causing damage to the robotic structure, e.g., see operation 318. In some approaches, the additional load may be estimated using known techniques for estimating a load that is experienced by a structure experiencing one or more identified conditions. In some other approaches, the additional load that will be applied to the robotic structure as a result of operating in the identified condition may be determined from a predefined table of values. The predefined table may include load values that are pre-associated with different values of different conditions. For example, it may be assumed that the robotic structure is a crane assembly, and the identified condition includes a twenty mile/hour windstorm. In such an example, the predefined table may include a predefined load to consider in order to prevent the structural threshold of the robotic structure from being exceeded. For example, the predefined table may have one-tenth of a ton of load pre-associated with the twenty mile/hour windstorm.

It is determined whether a sum of the current load applied to the robotic structure and the additional load, when applied to the robotic structure, exceed the structural threshold of the robotic structure, e.g., see decision 320. In continuation of the example above, the one-tenth of a ton of load associated with the windstorm may be added to a one-ton load that is currently being applied to the robotic structure, and the sum of the values may be compared with the structural threshold to determine whether a sum of the current load applied to the robotic structure and the additional load, when applied to the robotic structure, exceed the structural threshold of the robotic structure. In response to a determination that the sum of the current load and the additional load, when applied to the robotic structure, would exceed the structural threshold of the robotic structure, e.g., as illustrated by the "Yes" logical path of decision 320, a position of one or more additional swarm robots with respect to the robotic structure that would increase the structural strength of the robotic structure may be determined, e.g., see operation 322. Operation 324 includes causing, e.g., instructing, the one or more additional swarm robots to assume the determined position. In response to a determination that the sum of the current load and the additional load, when applied to the robotic structure, would not exceed the structural threshold of the robotic structure, e.g., as illustrated by the "No" logical path of decision 320, method 300 optionally ends, e.g., see "End." Operation 324 optionally continues to the "End" of method 300 as well. It should be noted however that in some preferred approaches, one or more operations of method 300 may continue to be performed during operation of the robotic structure to ensure that the structural threshold of the robotic structure is not exceeded.

It should be noted that although operations 316-324 are described as being determined with respect to a current load already being applied to the robotic structure, in some approaches such conditions may additionally and/or alternatively be identified before a load is applied to the robotic structure. In one or more of such approaches, decision 320 may optionally be made with respect a sum of an anticipated load, e.g., such as a payload, and an additional load, e.g., an additional load that the identified condition would cause the robotic structure to assume, before a load is assumed by the robotic structure.

Various benefits are enabled as a result of utilizing one or more of the techniques described herein to position one or more swarm robots with respect to a robotic structure to prevent a load that will be applied to the robotic structure from exceeding a structural threshold of the robotic structure. For example, there are cost benefits enabled as a result of the techniques described herein preventing a robotic structure from exceeding a structural threshold of the robotic structure. This is because if the structural threshold of the robotic structure was otherwise exceeded, the robotic structure may be damaged and require extensive repairs and suspended operation until the robotic structure is fixed and/or safety tested. Safety benefits are also enabled as a result of the techniques described herein preventing a robotic structure from exceeding a structural threshold of the robotic structure. This is because loads otherwise exceeding a structural threshold of a robotic structure may cause injury and/or death, e.g., as the robotic structure becomes unable to sustain the load. It should be noted that determining a position of one or more swarm robots with respect to a robotic structure to prevent a load that will be applied to the robotic structure from exceeding a structural threshold of the robotic structure, and causing the one or more swarm robots to assume the determined position has heretofore not been considered. As mentioned elsewhere herein, in sharp contrast to these novel techniques, conventional application of loads rely on fixed structures that are not adjusted based on a load that is applied thereto. More specifically, these fixed structures are not provided additional and/or less structural reinforcement during operation based on forces that are applied thereto. Accordingly, it is often the responsibility of an operator of the conventional robotic structure to ensure that the robotic structure does not experience a load that results in damage to the fixed structure. However, many operators have demonstrated an inability to accurately ensure that conventional robotic structures are not overloaded. Accordingly, the inventive discoveries disclosed herein with regards to causing one or more swarm robots to be positioned with respect to a robotic structure to prevent a load that will be applied to the robotic structure from exceeding a structural threshold of the robotic structure proceed contrary to conventional wisdom.

FIGS. 4A-4H depict a system 400, in accordance with various embodiments. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

System 400 of FIG. 4A includes a robotic structure 408 having a plurality of structural components, e.g., see 402, 404 and 406. The structural components 402 and 404 are pillar structural components, e.g., one or more I-beams, that supports the cross-beam structural component 406. An overhead crane component of the robotic structure 408 includes a cable 414 that is configured to suspend a load that will be applied to the robotic structure 408, e.g., see load 412 with a dashed line indicating that the load is not yet applied to the robotic structure 408. Once applied to the robotic structure 408, the load may move based on the overhead crane component of the robotic structure 408. This may change a previous bending force distribution, and therefore the one or more determinations with respect to loads that are currently applied and/or will be applied may be made and/or repeated in response to the load moving with respect to the robotic structure 408. Once the load is applied to the robotic structure 408 or carried by the robotic structure 408, the bending load 410 may be more than a structural threshold of the robotic structure 408. In the event that the bending load 410 exceeds the structural threshold of the robotic structure 408, one or more of the structural components of the robotic structure 408, e.g., a robotic arm, the structural component 402, the structural component 404, the structural component 406, etc., may be deformed.

In order to prevent structural deformation of the robotic structure 408 techniques described in various embodiments and approaches described herein, e.g., see method 300 may be implemented to prevent a predetermined structural threshold of the robotic structure 408 from being exceeded. In some approaches, in response to a determination that a current load applied to the robotic structure 408 and/or a load that will be applied to the robotic structure 408 exceeds such a predetermined structural threshold of the robotic structure 408, a structural strength of the robotic structure 408 may be increased by determining a position of one or more swarm robots with respect to the robotic structure that would increase a structural strength of the robotic structure. For example, in response to a determination that a predetermined bending force structural threshold of the robotic structure 408 is being and/or will be exceeded, the area moment of inertia of the robotic structure 408 may be increased, e.g., to increase a structural strength of one or more portions of the robotic structure 408 that would otherwise be damaged.

In one approach, in order to prevent a current load applied to the robotic structure 408 and/or a load that will be applied to the robotic structure 408 from exceeding a predetermined structural threshold of the robotic structure 408, while robots of the robotic structure 408 are performing activities, a physical state one or more portions of the robotic structure 408, e.g., such as a bending stress in a particular arm of the robotic structure, etc., may be evaluated. Known techniques may be used to calculate metrics of a physical state of such portions in some approaches. As will be further described elsewhere below, e.g., see FIGS. 4B-4H, one or more swarm robots may be dynamically coupled to the robotic structure 408 to ensure adequate physical strength of the robotic structure 408 is maintained, e.g., a bending stress in a particular arm of the robotic structure does not exceed a predetermined structural threshold.

Before performing activities, e.g., such as assuming the load 412, a surrounding context of the robotic structure 408, e.g., conditions that the robotic structure 408 will operate in, a load that will be applied to the robotic structure 408, a structural strength of the robotic structure 408, etc., may be analyzed to ensure that a predetermined structural threshold of the robotic structure 408 is not exceeded. For example, conditions that the robotic structure 408 will operate in may be considered using one or more techniques described elsewhere herein. In some approaches, a physical state of each and every portion of the robotic structure is incorporated into one or more determined positions for swarm robots in order to ensure that physical strengths of the robotic arm/structure are increased in the event that it is determined that a structural threshold of the robotic structure 408 is and/or will be exceeded.

In some approaches, based on the degree of change in a physical state of at least a portion of the robotic structure 408 while performing any activity and/or while an activity is planned to be performed, a number of swarm robots may be determined that, when caused to be coupled with the robotic structure 408, would results in a structural strength of the robotic structure 408 increasing. One or more additional and/or alternative factors, e.g., such as a direction of anticipated work, types of load such as static or variable, duration of applied load on any structure or robotic arm, etc., of the robotic structure 408 may be identified and factored into a determination of a direction of coupling of the one or more swarm robots to enable reporting and instructing of the one or more swarm robots in a timely manner, e.g., before a damaging load is applied to the robotic structure 408.

In some approaches, it may be identified whether an activity load is going to decrease, and accordingly, one or more swarm robots currently coupled to the robotic structure 408 may be dynamically removed from one or more portions of the robotic structure 408. This will allow the robotic structure 408 to continue to operate with a degree of structural strength that does not allow an applied load to damage the robotic structure 408. Digital twin simulation about the physical state of the swarm robots and/or the robotic structure 408 may additionally and/or alternatively be performed by the robotic structure 408 during active operation. Results of such simulation may be incorporated into one or more determinations of positions for the swarm robots with respect to the robotic structure 408.

Various examples of determined positions of one or more swarm robots with respect to the robotic structure 408 that prevents a load from exceeding a structural threshold of the robotic structure 408 are described in FIGS. 4B-4H. An area moment of inertia of the robotic structure 408 is increased as a result of the one or more swarm robots assuming the determined position(s).

Referring now to FIG. 4B, a load has been applied to the robotic structure 408, e.g., see applied load 416. In order to prevent a predetermined structural threshold of the robotic structure 408 from being exceeded as a result of the load 416 being applied to the robotic structure 408, a plurality of swarm robots 418 are caused to assume a position that is determined to increase the structural strength of the robotic structure 408. Specifically, in FIG. 4B, the plurality of swarm robots 418 are caused to be positioned in a cluster that forms an arc such that the cross-beam structural component 406 is supported from a bending force experienced as a result of the applied load 416.

Referring now to FIG. 4C, a plurality of swarm robots 420 are caused to be positioned in a cluster that forms a triangle such that the cross-beam structural component 406 is supported from the bending force experienced as a result of the applied load 416.

Referring now to FIG. 4D, a first plurality of swarm robots 420 and a second plurality of swarm robots 422 are each caused to be positioned in a cluster that forms a triangle such that the cross-beam structural component 406 is supported from the bending force experienced as a result of the applied load 416.

Referring now to FIG. 4E, a plurality of swarm robots 424 are caused to be positioned in linear clusters such that the cross-beam structural component 406 is supported from the bending force experienced as a result of the applied load 416.

Referring now to FIG. 4F, a first and second plurality of swarm robots 426 are caused to be positioned in a linear cluster, e.g., each forming another pillar structural component of the robotic structure 408, such that the cross-beam structural component 406 is supported from the bending force experienced as a result of the applied load 416.

Referring now to FIG. 4G, first and second swarm robots 428 are caused to be positioned such that the cross-beam structural component 406 is supported from the bending force experienced as a result of the applied load 416.

Referring now to FIG. 4H, a first and second plurality of swarm robots 430 are caused to be positioned in a cluster such that the cross-beam structural component 406 is supported from the bending force experienced as a result of the applied load 416.

Figure 5A:
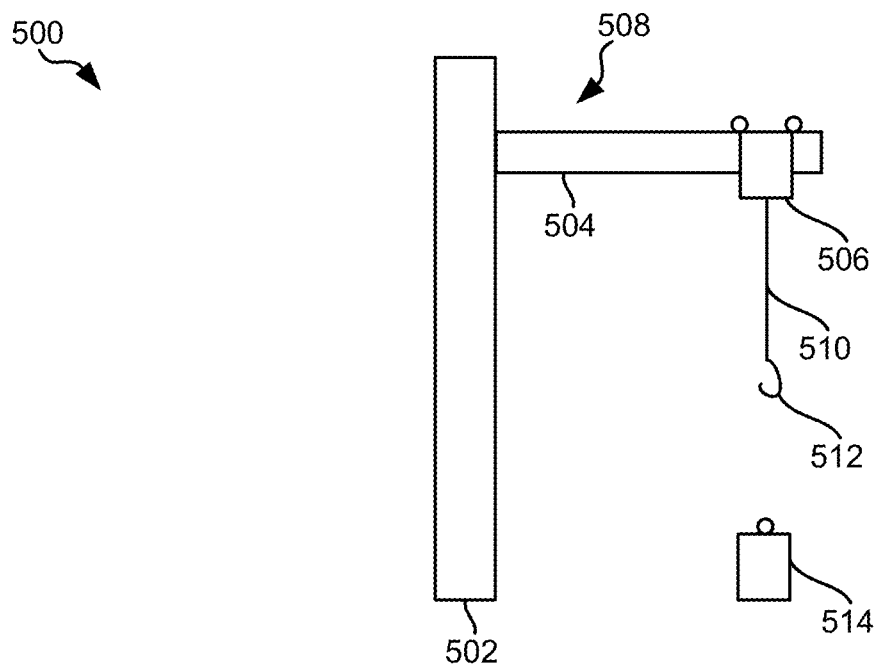
FIG. 5A is system that includes a robotic structure prior to a load being applied to the robotic structure, in accordance with one embodiment.
Figure 5B:
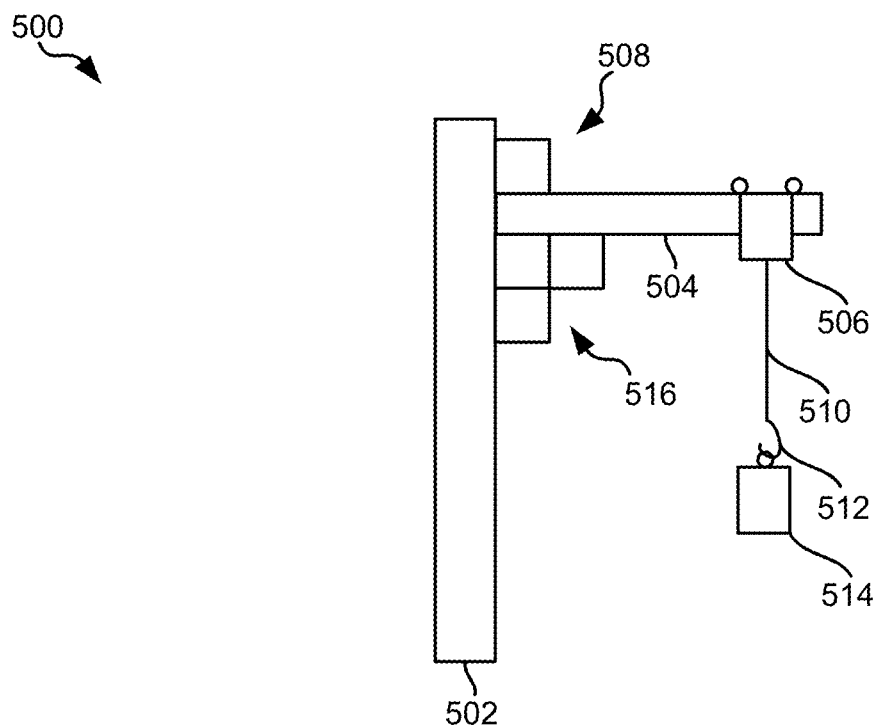
FIG. 5B is the system of FIG. 5A with a plurality of swarm robots positioned to increase a structural strength of the robotic structure, in accordance with one embodiment.

FIGS. 5A-5B depict a system 500, in accordance with various embodiments. As an option, the present system 500 may be implemented in conjunction with features from any other embodiment listed herein, such as those described with reference to the other FIGS. Of course, however, such system 500 and others presented herein may be used in various applications and/or in permutations which may or may not be specifically described in the illustrative embodiments listed herein. Further, the system 500 presented herein may be used in any desired environment.

System 500 of FIG. 5A includes a robotic structure 508 having a plurality of structural components, e.g., see structural component 502 and structural component 504. The structural component 502 is pillar structural component that supports a cantilever structural component 504. An overhead roller crane component 506 of the robotic structure 508 includes a cable 510 and hook 512 that is configured to suspend a load 514 that will be applied to the robotic structure 508. In the event that a bending load of the cantilever structural component 504 exceeds a predetermined structural threshold of the robotic structure 508, one or more of the structural components of the robotic structure 508 may be deformed.

Referring now to FIG. 5B, the load 514 has been applied to the robotic structure 508. In order to prevent a predetermined structural threshold of the robotic structure 508 from being exceeded as a result of the load 514 being applied to the robotic structure 508, a plurality of swarm robots 516 are caused to assume a position that is determined to increase the structural strength of the robotic structure 508. Such a position may be determined using techniques described elsewhere herein, e.g., see method 300. Specifically, in FIG. 5B, the plurality of swarm robots 516 are caused to be positioned in a cluster that forms an triangle at about a position of a maximum load of the cantilever structural component 504, such that the cantilever structural component 504 is supported from a downward bending force experienced as a result of the applied load 514.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a load that will be applied to a robotic structure;
determining whether the load, when applied to the robotic structure, would exceed a structural threshold of the robotic structure;
in response to determining that the load, when applied to the robotic structure, would exceed the structural threshold, determining a position of one or more swarm robots with respect to the robotic structure that would increase a structural strength of the robotic structure;
causing the one or more swarm robots to assume the determined position; and
in response to a determination that a current load applied to the robotic structure has been reduced: causing a determined one or more swarm robots to detach from the robotic structure.

2. The computer-implemented method of claim 1, comprising: in response to the determination that the current load applied to the robotic structure has been reduced:
determining the one or more swarm robots to detach from the robotic structure, wherein the one or more swarm robots, as a result of being detached from the robotic structure, prevent the current load from exceeding the structural threshold of the robotic structure.

3. The computer-implemented method of claim 1, wherein the structural threshold is a predetermined bending stress of the robotic structure, wherein determining whether the load, when applied to the robotic structure, would exceed the structural threshold of the robotic structure includes: determining a moment of inertia of the robotic structure, and determining whether the bending stress of the robotic structure, when the load is applied about the moment of inertia of the robotic structure, would be exceeded.

4. The computer-implemented method of claim 1, comprising: performing a digital twin simulation of applying the load to the robotic structure, wherein the determination of whether the load, when applied to the robotic structure, exceeds the structural threshold of the robotic structure is based on results of the performed digital twin simulation.

5. The computer-implemented method of claim 1, comprising:
identifying a condition that the robotic structure is scheduled to operate in while the current load is applied to the robotic structure;
determining an additional load that will be applied to the robotic structure as a result of operating in the identified condition;
determining whether a sum of the current and the additional load, when applied to the robotic structure, would exceed the structural threshold of the robotic structure;
in response to a determination that the sum of the current load and the additional load, when applied to the robotic structure, would exceed the structural threshold of the robotic structure, determining a second position of one or more additional swarm robots with respect to the robotic structure that would increase the structural strength of the robotic structure; and
causing the one or more additional swarm robots to assume the second position.

6. The computer-implemented method of claim 5, wherein the condition is selected from the group consisting of: environmental temperature, wind speed, ambient light, moisture content, and humidity.

7. The computer-implemented method of claim 1, comprising: causing a plurality of the swarm robots to assume the determined position, wherein the determined position is one in which the plurality of the swarm robots are in a cluster in which the swarm robots are attached to one another in the cluster.

8. The computer-implemented method of claim 1, wherein an area moment of inertia of the robotic structure is increased as a result of the one or more swarm robots assuming the determined position.

9. A computer program product, the computer program product comprising a non-transitory computer readable storage medium having program instructions embodied therewith, the program instructions readable and/or executable by a computer to cause the computer to:
identify, by the computer, a load that will be applied to a robotic structure;
determine, by the computer, whether the load, when applied to the robotic structure, would exceed a structural threshold of the robotic structure;
in response to determining that the load, when applied to the robotic structure, would exceed the structural threshold, determine, by the computer, a position of one or more swarm robots with respect to the robotic structure that would increase a structural strength of the robotic structure;
cause, by the computer, the one or more swarm robots to assume the determined position; and
in response to a determination that a current load applied to the robotic structure has been reduced: causing a determined one or more swarm robots to detach from the robotic structure.

10. The computer program product of claim 9, the program instructions readable and/or executable by the computer to cause the computer to: in response to the determination, by the computer, that the current load applied to the robotic structure has been reduced:
determine the one or more swarm robots to detach from the robotic structure, wherein the one or more swarm robots, as a result of being detached from the robotic structure, prevent the current load from exceeding the structural threshold of the robotic structure.

11. The computer program product of claim 9, wherein the structural threshold is a predetermined bending stress of the robotic structure, wherein determining whether the load, when applied to the robotic structure, would exceed the structural threshold of the robotic structure includes: determining a moment of inertia of the robotic structure, and determining whether the bending stress of the robotic structure, when the load is applied about the moment of inertia of the robotic structure, would be exceeded.

12. The computer program product of claim 9, the program instructions readable and/or executable by the computer to cause the computer to: perform, by the computer, a digital twin simulation of applying the load to the robotic structure, wherein the determination of whether the load, when applied to the robotic structure, exceeds the structural threshold of the robotic structure is based on results of the performed digital twin simulation.

13. The computer program product of claim 9, the program instructions readable and/or executable by the computer to cause the computer to:
   identify, by the computer, a condition that the robotic structure is scheduled to operate in while the current load is applied to the robotic structure;
   determine, by the computer, an additional load that will be applied to the robotic structure as a result of operating in the identified condition;
   determine, by the computer, whether a sum of the current load and the additional load, when applied to the robotic structure, would exceed the structural threshold of the robotic structure;
   in response to a determination that the sum of the current load and the additional load, when applied to the robotic structure, would exceed the structural threshold of the robotic structure, determine, by the computer, a second position of one or more additional swarm robots with respect to the robotic structure that would increase the structural strength of the robotic structure; and
   cause, by the computer, the one or more additional swarm robots to assume the second position.

14. The computer program product of claim 13, wherein the condition is selected from the group consisting of: environmental temperature, wind speed, ambient light, moisture content, and humidity.

15. The computer program product of claim 9, the program instructions readable and/or executable by the computer to cause the computer to: cause, by the computer, a plurality of the swarm robots to assume the determined position, wherein the determined position is one in which the plurality of the swarm robots are a cluster in which the swarm robots are attached to one another in the cluster.

16. The computer program product of claim 9, wherein an area moment of inertia of the robotic structure is increased as a result of the one or more swarm robots assuming the determined position.

17. A system, comprising:
   a processor; and
   logic integrated with the processor, executable by the processor, or integrated with and executable by the processor, the logic being configured to:
   identify a load that will be applied to a robotic structure;
   determine whether the load, when applied to the robotic structure, would exceed a structural threshold of the robotic structure;
   in response to determining that the load, when applied to the robotic structure, would exceed the structural threshold, determine a position of one or more swarm robots with respect to the robotic structure that would increase a structural strength of the robotic structure;
   cause the one or more swarm robots to assume the determined position,
   wherein an area moment of inertia of the robotic structure is increased as a result of the one or more swarm robots assuming the determined position.

18. The system of claim 17, the logic being configured to:
in response to a determination that a current load applied to the robotic structure has been reduced:
   determine one or more swarm robots, that when detached from the robotic structure, would not result in the current load exceeding the structural threshold of the robotic structure, and
   cause the determined one or more swarm robots to detach from the robotic structure.

19. The system of claim 17, wherein the structural threshold is a predetermined bending stress of the robotic structure, wherein determining whether the load, when applied to the robotic structure, would exceed the structural threshold of the robotic structure includes: determining a moment of inertia of the robotic structure, and determining whether the bending stress of the robotic structure, when the load is applied about the moment of inertia of the robotic structure, would be exceeded.

20. The system of claim 17, the logic being configured to: perform a digital twin simulation of applying the load to the robotic structure, wherein the determination of whether the load, when applied to the robotic structure, exceeds the structural threshold of the robotic structure is based on results of the performed digital twin simulation.

* * * * *